(12) United States Patent
Giraud et al.

(10) Patent No.: US 10,409,021 B2
(45) Date of Patent: *Sep. 10, 2019

(54) HOLDER OF VARIOUS TYPES OF FIBER OPTIC CABLE MODULES

(71) Applicant: Corning Optical Communications LLC, Hickory, NC (US)

(72) Inventors: William Julius McPhil Giraud, Azle, TX (US); Diana Rodriguez, Forth Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/616,295

(22) Filed: Jun. 7, 2017

(65) Prior Publication Data

US 2017/0269318 A1 Sep. 21, 2017

Related U.S. Application Data

(62) Division of application No. 14/448,181, filed on Jul. 31, 2014, now Pat. No. 9,678,295.

(51) Int. Cl.
*G02B 6/44* (2006.01)

(52) U.S. Cl.
CPC ......... *G02B 6/4455* (2013.01); *G02B 6/4452* (2013.01)

(58) Field of Classification Search
CPC ....... G02B 6/4455; G02B 6/4452; G02B 6/46
USPC ....................................... 385/135
See application file for complete search history.

(56) References Cited

U.S. PATENT DOCUMENTS

| | | | |
|---|---|---|---|
| 5,071,211 A | 12/1991 | Debortoli et al. | |
| 5,167,001 A * | 11/1992 | Debortoli | G02B 6/3897 385/135 |
| 6,520,311 B1 | 2/2003 | Maeda et al. | |
| 7,139,461 B2 * | 11/2006 | Puetz | G02B 6/3897 385/135 |
| 7,226,316 B2 | 6/2007 | Wu | |
| 8,009,954 B2 | 8/2011 | Bran De Leon et al. | |
| 8,019,192 B2 * | 9/2011 | Puetz | G02B 6/3897 385/135 |
| 8,561,817 B1 | 10/2013 | Allen | |
| 8,843,052 B2 | 9/2014 | Yokoyama et al. | |
| 2007/0047896 A1 * | 3/2007 | Kowalczyk | G02B 6/4452 385/135 |
| 2007/0147765 A1 * | 6/2007 | Gniadek | G02B 6/4453 385/135 |
| 2009/0060441 A1 * | 3/2009 | Kowalczyk | G02B 6/4441 385/135 |
| 2010/0054684 A1 * | 3/2010 | Cooke | G02B 6/4452 385/135 |

(Continued)

OTHER PUBLICATIONS

Non-Final Office Action for U.S. Appl. No. 14/448,181, dated Aug. 12, 2016, 10 pages.

(Continued)

*Primary Examiner* — Akm E Ullah
(74) *Attorney, Agent, or Firm* — Grant A. Gildehaus (57) ABSTRACT

A holder for a plurality of fiber optic cable modules. The holder may includes a tray, wherein the tray is movably positionable in a chassis; and a plurality of mounts coupled to the tray, each mount configured to releasably retain a module of a plurality of various types of modules relative to the tray.

17 Claims, 10 Drawing Sheets

(56) References Cited

U.S. PATENT DOCUMENTS

| | | | | |
|---|---|---|---|---|
| 2010/0322583 A1* | 12/2010 | Cooke | ............... | G02B 6/4452 385/135 |
| 2011/0211799 A1* | 9/2011 | Conner | ............... | G02B 6/4471 385/135 |
| 2013/0094828 A1* | 4/2013 | Loeffelholz | ............... | G02B 6/4453 385/135 |
| 2015/0268435 A1* | 9/2015 | Blackwell, Jr. | ............... | G02B 6/4454 385/135 |
| 2016/0033732 A1* | 2/2016 | Giraud | ............... | G02B 6/4452 385/135 |

OTHER PUBLICATIONS

Notice of Allowance for U.S. Appl. No. 14/448,181, dated Feb. 21, 2017, 9 pages.

* cited by examiner

HOLDER OF VARIOUS TYPES OF FIBER OPTIC CABLE MODULES

PRIORITY APPLICATION

This application is a divisional of pending U.S. application Ser. No. 14/448,181, filed on Jul. 31, 2014. The entire contents of each of which are hereby incorporated by reference as if presented herein.

BACKGROUND

The disclosure relates generally to fiber optical cable apparatuses and more particularly to a fiber optic cable module holder, a frame having a chassis for using the holder and a related method, all of which may be used in network equipment including optical cables.

In optical cable networking apparatuses, including convergence points and distribution frames, such as in fiber-optics networking, there is a constant demand for an apparatus permitting high-density distribution with very high fiber termination counts in a small, confined volume. Ongoing needs exist for optical fiber an apparatuses having features that make installing, establishing maintaining, and repairing network connections more convenient and efficient. Fiber optic cable modules are used for ease of connections at convergence points but are not readily applicable relative to distribution frames.

SUMMARY

One embodiment of the disclosure relates to holder for a plurality of fiber optic cable modules. The holder may include a tray that is movably positionable in a chassis. A plurality of mounts may be coupled to the tray. Each mount may be configured to releasably retain a module of a plurality of various types of fiber optic cable modules relative to the tray.

An additional embodiment of the disclosure relates to a fiber optic cable frame. The frame may include a chassis including a plurality of slots. Each slot may be configured to hold a fiber optic cable module holder. Each module holder may include: a tray that may be movably positionable in the chassis; and a plurality of mounts coupled to the tray, each mount configured to releasably retain a module of a plurality of various types of fiber optic cable modules relative to the tray.

Another embodiment of the disclosure relates to a method. The method may include providing a fiber optic cable module holder including: a tray that is movably positionable in a chassis, and a plurality of mounts coupled to the tray, each mount configured to releasably retain a module of a plurality of various types of fiber optic cable modules relative to the tray.

The method may also include mounting at least one module to a respective mount of the holder. A plurality of fiber optic cables can be coupled using the at least one module, and the holder may be positioned in a slot of a chassis.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

The terms "optical fibers," "fiber cables" and "fiber optic cables" include all types of single mode and multi-mode light waveguides, including one or more optical fibers that may be uncoated, colored, buffered, ribbonized and/or have other organizing or protective structure in a cable such as one or more tubes, strength members, jackets or the like. An example of a fiber optic cable is MIC® cable provided by Corning Optical Communications LLC. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Cartesian axes may be shown in the figures for the sake of reference only and are not intended to be limiting with respect to direction or orientation. Additionally, for sake of reference only and not by way of limitation, the Cartesian axes shown in the figures include arrows that consistently define a particular direction with respect to each axis in all figures that depict the same object in different orientations. Throughout this disclosure, relational terms will be used by a convention in view of the Cartesian axes of the figures and the positive directions indicated by the arrows. According to the convention, relationships relative to the x-axis of any object may be expressed using terms such as left, right, to the left of, or to the right of. According to the convention, relationships relative to the y-axis of any object may be expressed using terms such as front, back, in front of or proximal to, rear, behind or distal to. According to the convention, relationships relative to the z-axis of any object may be expressed using terms such as top, bottom, above, below, over, or under. Neither the convention nor the terms used to express various relationships are intended to limit any object or component thereof to a direction or orientation in construction or in use.

Embodiments of a module holder for fiber optical cables will now be described with reference to the figures.

Figure 1:
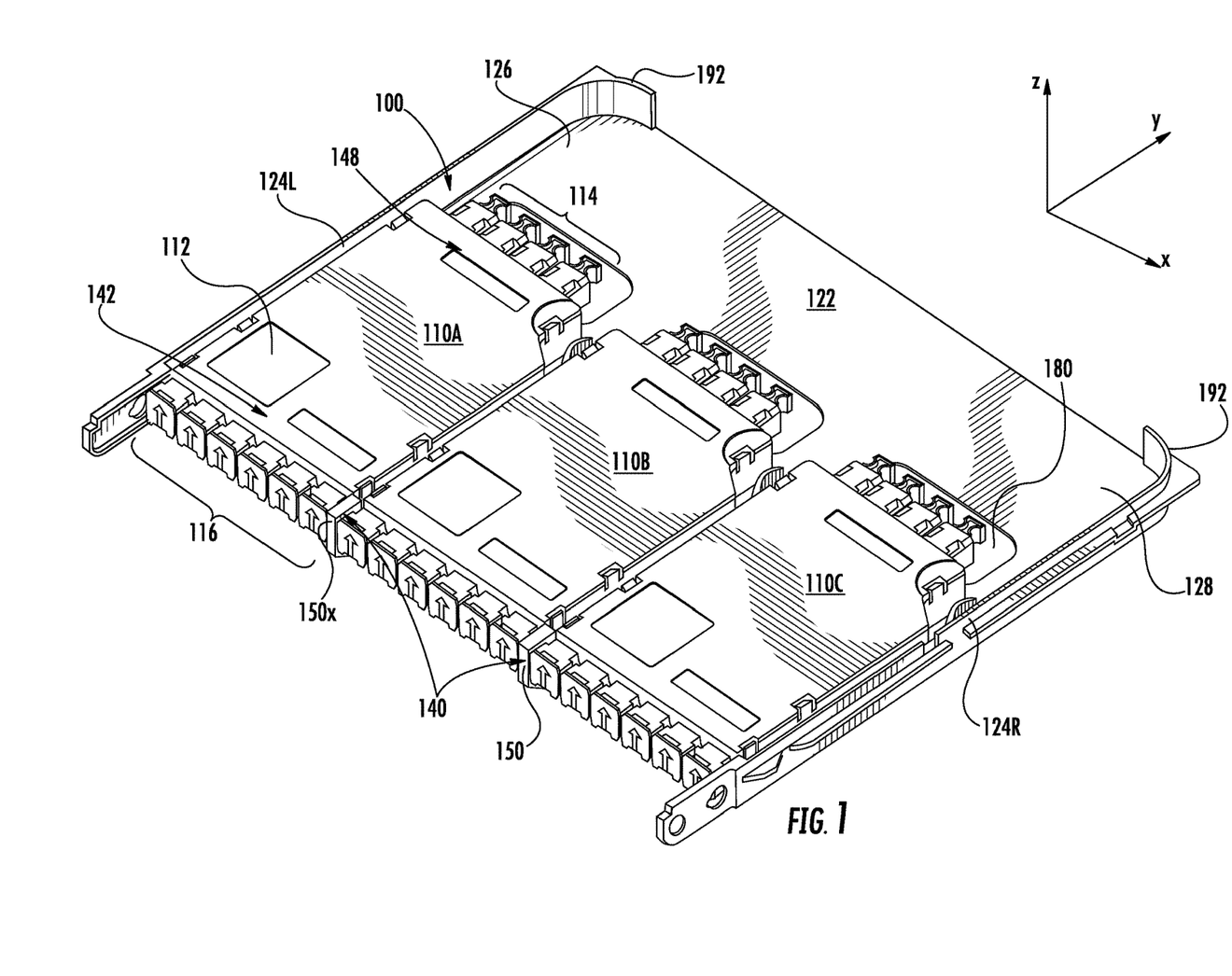
FIG. 1 is a right perspective view of one embodiment of a fiber optic cable module holder according to the invention.
Figure 2:
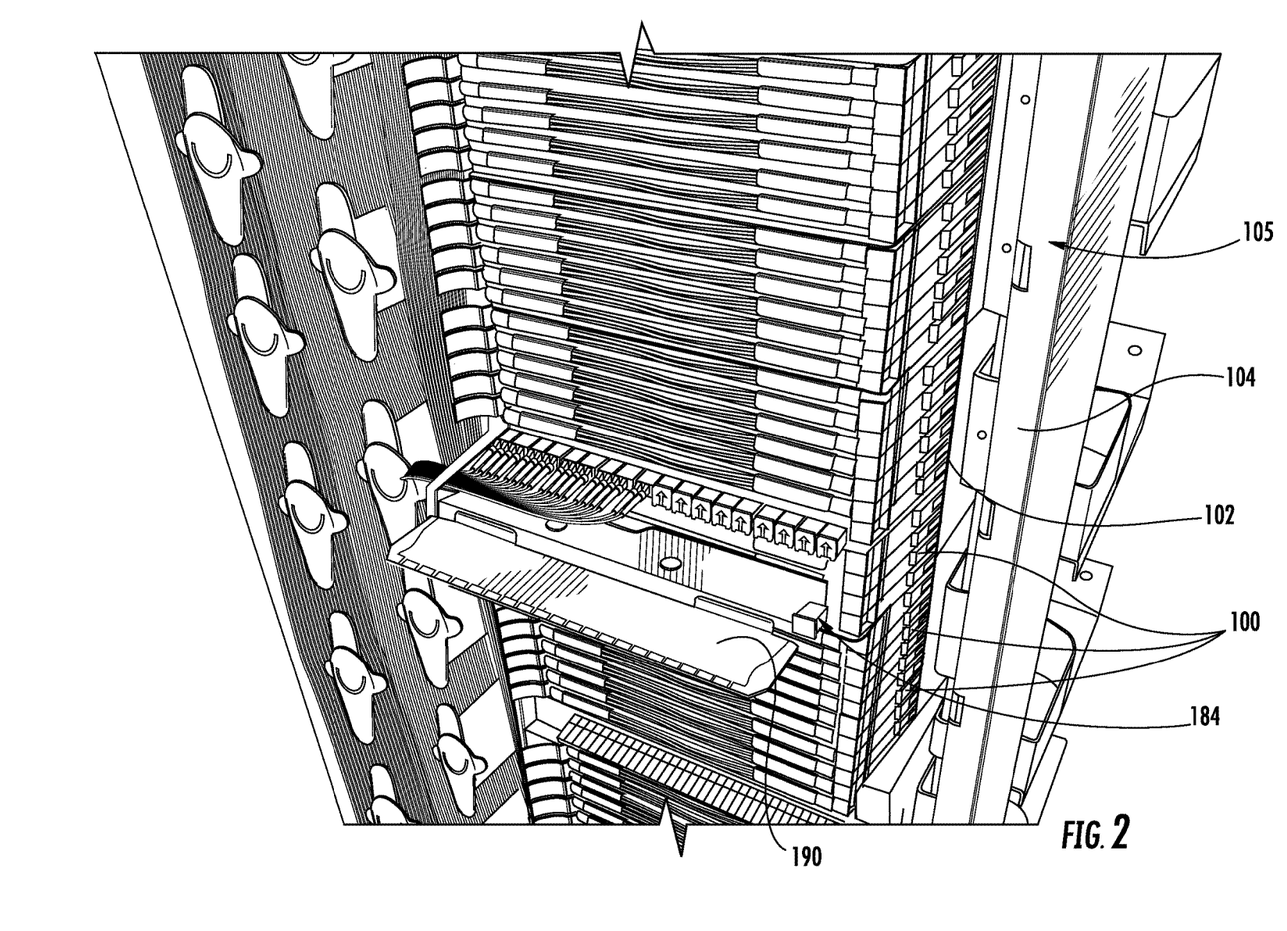
FIG. 2 is a front perspective view of a fiber optic cable distribution frame including a module holder according to embodiments of the invention.

FIG. 1 shows a perspective view of one embodiment of a fiber optic cable module holder 100 (hereinafter "module holder 100") according to the invention, and FIG. 2 shows on application of module holder 100. As will be described herein, module holder 100 is configured to mount one or more of a variety of modules thereto and allow mounting of the various modules chosen in a chassis of a conventional fiber optic cable distribution frame. More particularly, with brief reference to FIG. 2, each module holder 100 is sized to mount into a slot 102 of a chassis 104 of a conventional fiber optic cable distribution frame 105. Rather than hold a conventional manual splice, single housing, module holder 100 is configured to hold, as shown in FIG. 1, a plurality of smaller modules 110, e.g., 110A-C. As used herein, chassis 104 of fiber optic cable distribution frame may include any now known or later developed chassis capable of holding a plurality of typically planar fiber optic cable connector housings. Conventionally, these housings require manual splicing connections within an interior thereof. Chassis 104 may include, for example, a Centrix® brand chassis available from Corning Optical Communications LLC; however, other chassis are also equally applicable. As understood, chassis 104 can be used in a large variety of locations to provide high density fiber optic cable connectivity, e.g., in a telecommunications closet or an outdoor weatherproof cabinet.

A fiber optic cable module or simply "module", as used herein, may include any form of plug-and-play connector for fiber optic cable. For example, a "module" may include some sort of housing 112 (FIGS. 1, 3 and 4) that includes a number of connectors 114 in one (back) side for trunk-like fiber optic cables, couplers inside the housing (not shown) that couple to each fiber and split and/or redirect them to other connectors 116 on another (front) side of the housing. Connectors 116 may be for individual fibers or smaller groups of fibers from the trunk-like fiber optic cable connected to connector(s) 114. As can be observed in the various drawings, including FIGS. 1 and 3-5 in particular, modules 110 can come in a variety of connector arrangements such as but not limited to 4×12 (FIG. 1), 4×6 (FIG. 3), 1×12 (FIG. 4), 2×3 (FIG. 5), etc. In these examples, modules allow for plug-and-play ease of connection of fiber optic cables, i.e., without manual splicing. Holder 100 can be configured to accommodate any brand of module; however, for description purposes those illustrated are from the EDGE® line of modules available from Corning Optical Communications LLC. "Module" as used herein may also include structures, sometimes referred to interchangeably as cassettes, that only have connectors (e.g., like 114, 116) on one side with a cable on the opposite side. Other forms of modules 110 than those illustrated and described herein may also be accommodated by module holder 100.

Figures 3, 4:
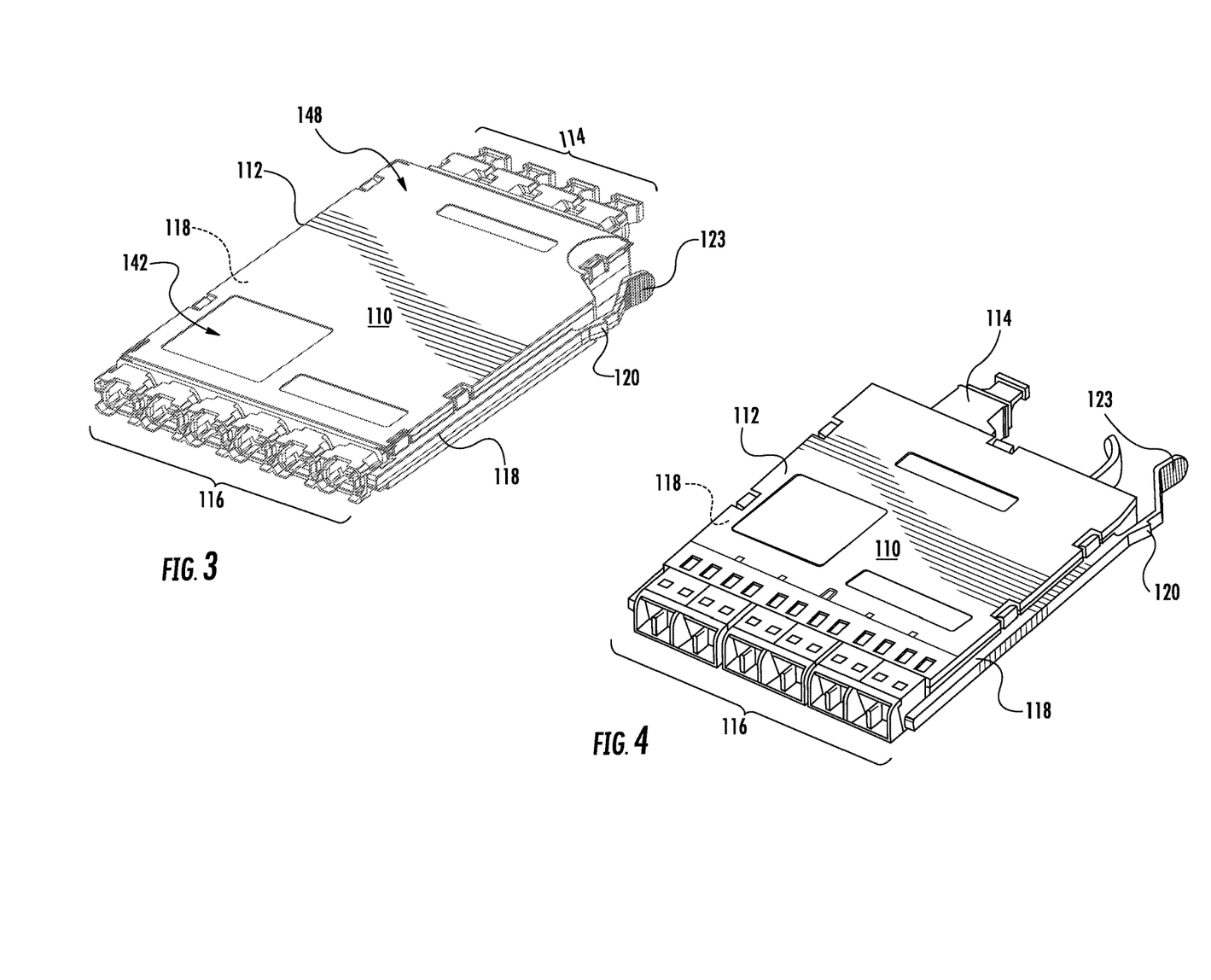
FIGS. 3 and 4 are perspective views of a variety of modules mountable to a module holder according to various embodiments of the invention.

As shown in FIGS. 3 and 4, each module 110 also may include mounting rail 118 on each side of housing 112 and a latch 120 on near a rear end on one side of housing 112. As illustrated, latch 120 may be biased by way of its positioning and material composition to act as a spring-loaded member; however, this spring-loaded function need not be present in all instances. Latch 120 may include a finger engagement member 123 for moving latch 120 between engaged and released positions in a known fashion.

Figure 6:
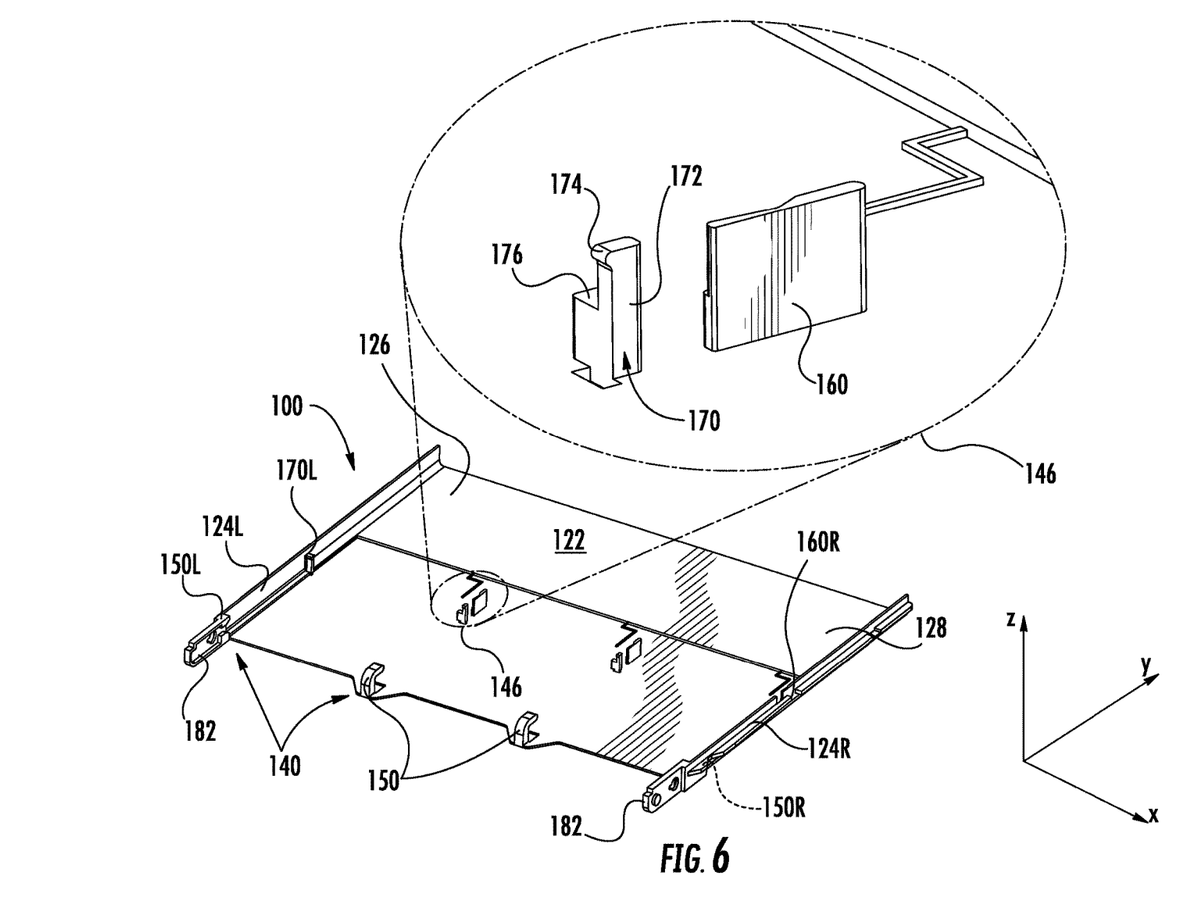
FIG. 6 is a right perspective view of an embodiment of the module holder without any modules.
Figure 7:
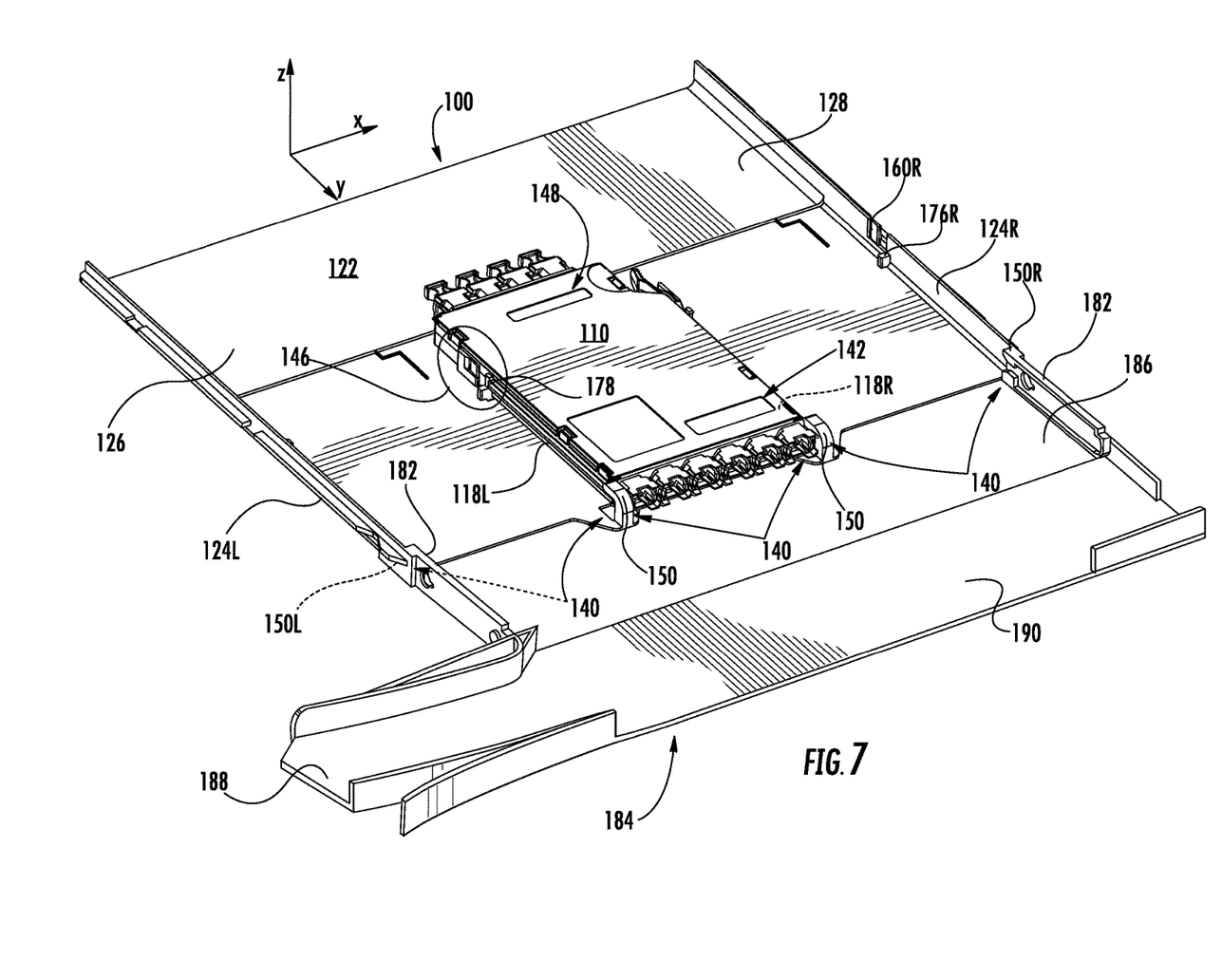
FIG. 7 is a left perspective view of an embodiment of the module holder holding a single module.
Figure 8:
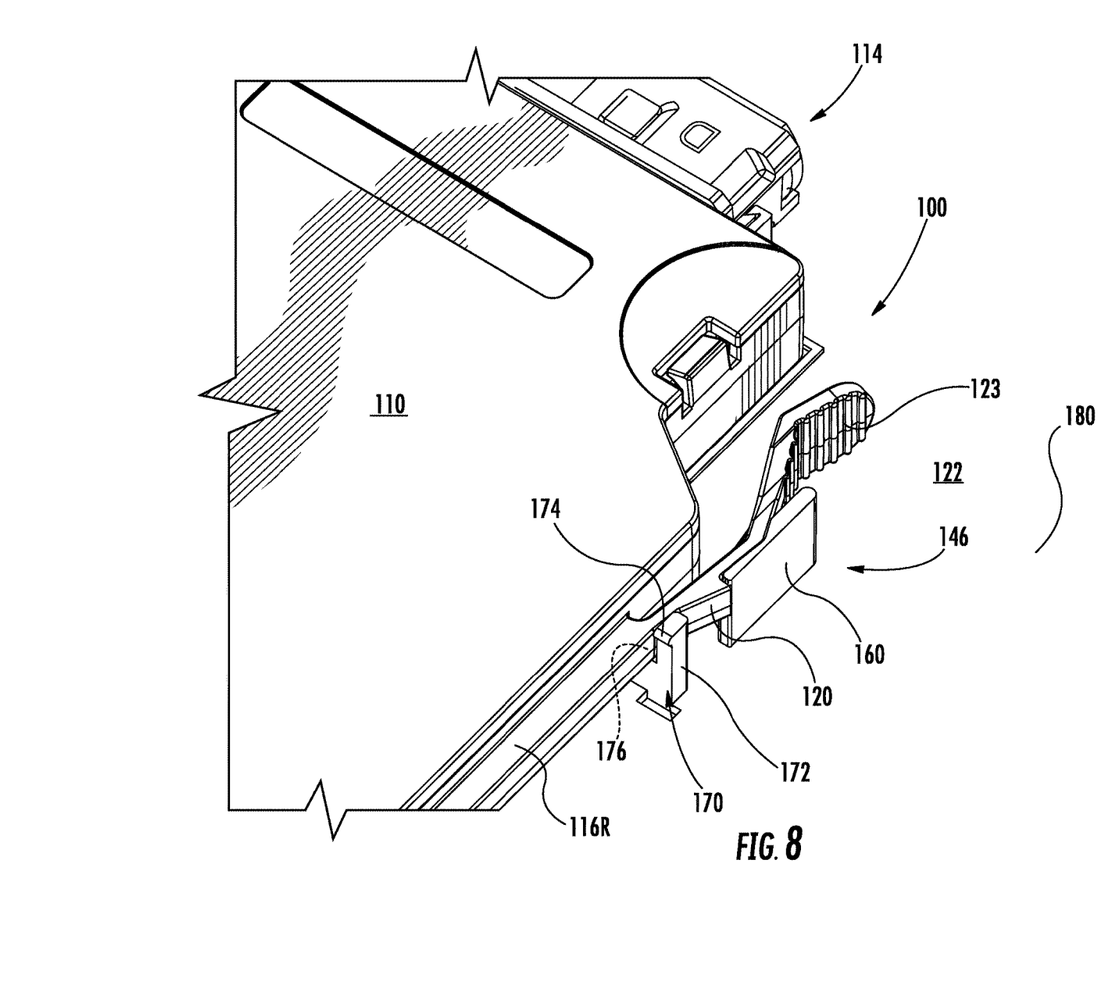
FIG. 8 is an enlarged perspective view of one embodiment of a portion of a rear retaining member of the module holder.
Figure 9:
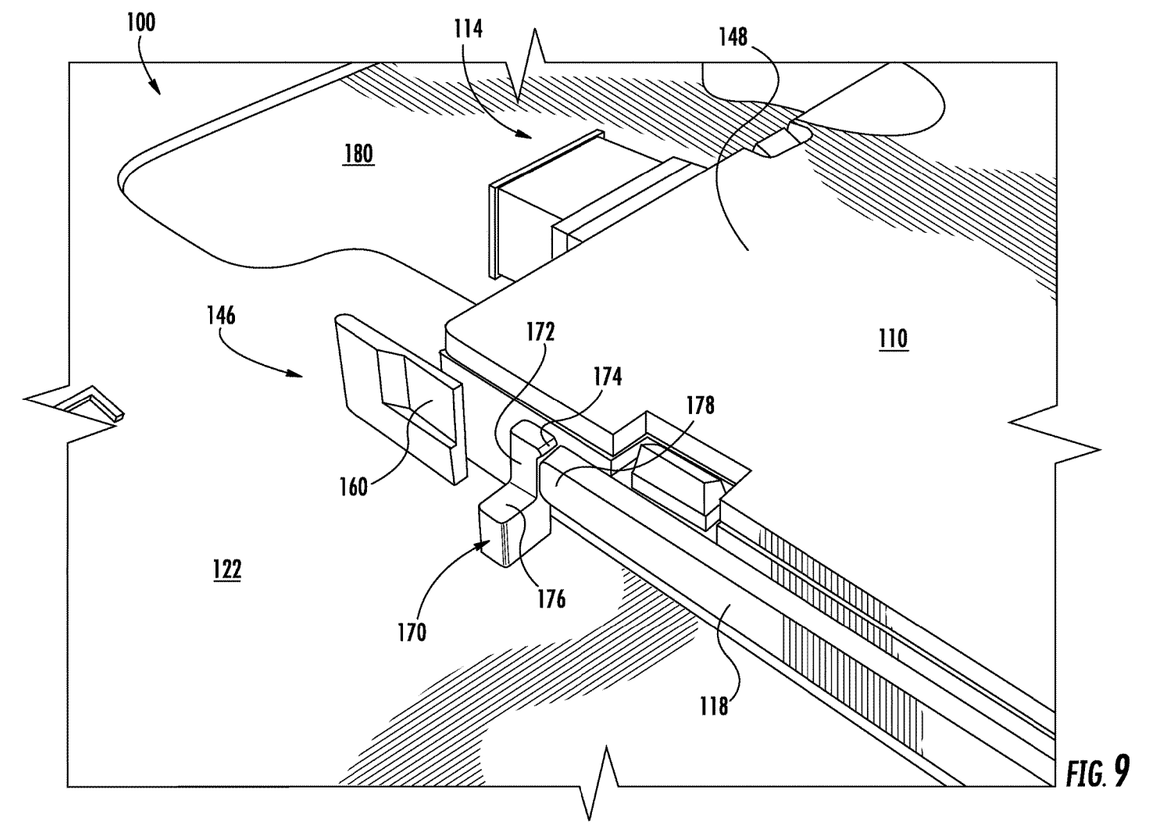
FIG. 9 is an enlarged perspective view of one embodiment of another portion of a rear retaining member of the module holder.

Referring to FIGS. 1, 6 and 7, module holder 100 will now be described in detail. FIG. 1 shows a perspective view of module holder 100 with three modules 110A-C mounted thereto; FIG. 6 shows a left perspective view of holder 100 without any modules mounted thereto and an exploded detail of a rear retaining member 146; and FIG. 7 shows a right perspective view of holder 100 with one, central module 110 mounted thereto. Although module holder 100 has been illustrated as being capable of mounting up to three modules 110A-C, it is emphasized that holder 100 can be configured to accommodate any number of modules capable of positioning within its width, assuming the width of the modules are decreased or enlarged from that shown. Holder 100 may include a tray 122. Tray 122 may include any substantially planar element capable of supporting modules 110. As shown in FIG. 2, module holder 100, via tray 122, is movably positionable in chassis 104.

As shown in FIGS. 6 and 7, module holder 100 also includes a plurality of mounts coupled to tray 122. Each mount may be configured to releasably retain a module of a plurality of various types of modules relative to tray 122. As each mount includes various parts, the mounts are not numbered as a unit in the drawings. However, the parts of one collective mount is shown by phantom circles in FIG. 6. As will be described in greater detail herein, module holder 100 may also include a pair of rails 124L, 124R. Each rail 124L, 124R protrudes from one of a pair of opposing sides 126, 128 of tray 122 for positioning holder 100 in chassis 104 (FIG. 2). That is, tray 122 along with rails 124L, 124R are sized such that holder 100 may slide easily into a conventional slot 102 (FIG. 2) in chassis 104 (FIG. 2).

Turning to the details of the mounts, each mount may include a front retaining member 140 for retaining a first (front) end 142 (FIG. 1) of a respective module 110 to tray 122, and a rear retaining member 146 for retaining a second (rear) end 148 (FIG. 1) of the respective module to the tray. Collectively, retaining members 140, 146 allow releasable retention of various types of modules relative to holder 100.

Figure 5:
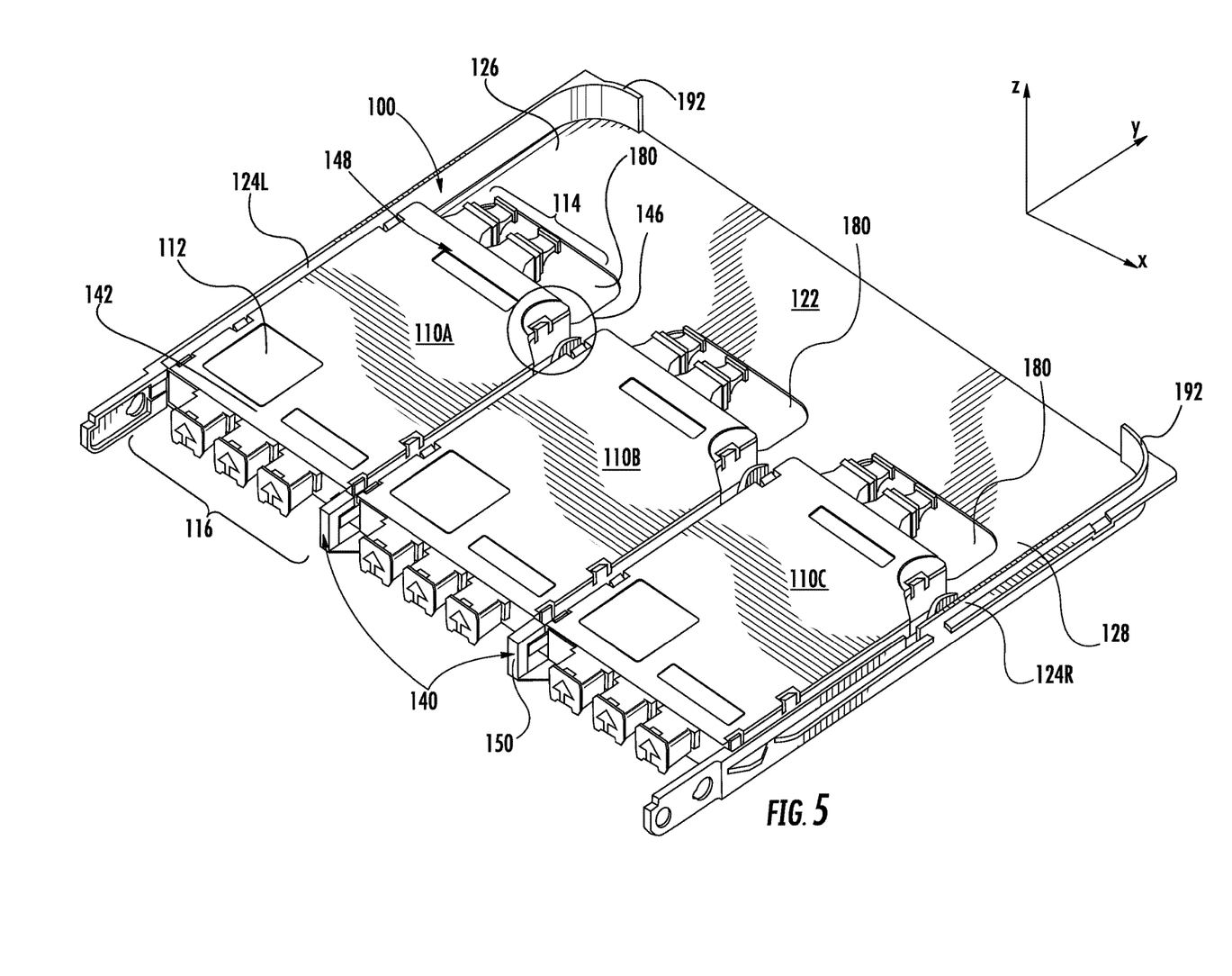
FIG. 5 is a right perspective view of an embodiment of the module holder mounting a different type of module than FIG. 1.
Figure 10:
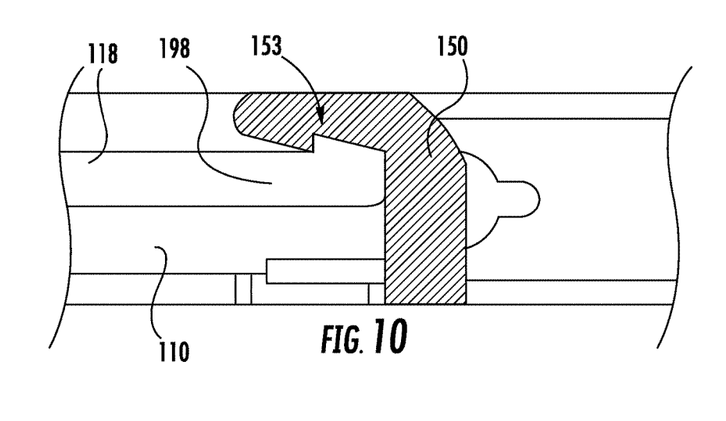
FIG. 10 is an enlarged cross-sectional view of an alternative embodiment of a front retaining member of the module holder.

As observed best in FIG. 7, in one embodiment, front retaining member 140 may include a pair of hook members 150 protruding from tray 122. Each hook member 150 may engage a respective mounting rail 118L, 118R (latter hidden on right side of module 110) on a side of the respective module 110. As shown best in FIGS. 11-13, each hook member 150 engages a front end 198 of a respective mounting rail 118 to retain the end against tray 122. While providing the retaining function, hook members 150 also allow free access to connectors 116 (FIG. 5). As also shown best in FIGS. 11-13, each hook member 150 may include a rounded end 152 for easing entrance of front end 142, and in particular, a front end 198 of mounting rail 118 of module 110 therein. Where only one module 110 is provided, such as in FIG. 7, each hook member 150 may retain one mounting rail 118 of a respective module 110. However, as shown in FIGS. 1 and 5, each hook member 150 may retain a pair of first ends 142 of adjacent modules 110 to tray 122. That is, at least one hook member 150 engages adjacent mounting rails 118 of a pair of adjacent modules, e.g., 110A-110B in FIG. 1, to retain a pair of first ends 142 of adjacent modules to tray 122. In this case, each hook member 150 positioned to retain a pair of modules (e.g., 110A-110B or 110B-110C in FIGS. 1 and 5) has sufficient width to engage mounting rails 118L, 118R of adjacent modules such that both are retained to tray 122. For example, hook member 150x in FIG. 1 retains adjacent mounting rails of modules 110A and 110B, respectively. As shown in FIGS. 6 and 7, front retaining member 140 may also include a hook member 150L, 150R in each rail 124L, 124R, respectively, such that outermost modules 110A, 110C (FIG. 1) may be retained. Hook members 150L, 150R need not be as wide as those that engage two mounting rails 118. Although front retaining member 140 has been described herein as including hook members 150, it should be emphasized that a variety of other mechanisms may be employed to retain front end(s) 142 of modules 110 to tray 122 other than hook members 150. In addition, hook members 150 may include other features to assist in retaining end 198 of mounting rail 118. For example, as shown in FIG. 10, end 198 of mounting rail 118 and hook members 150 may include mating catches 153. It is understood that the number of front retaining members 140, i.e., hook members 150, may be altered to accommodate more or fewer modules 110.

Referring to FIGS. 6-9, details of rear retaining member 146 will now be described. As illustrated, rear retaining member 146 may include a catch 160 protruding from tray 122 for longitudinally engaging latch 120 of a first module 110 of a pair of adjacent modules, e.g., 110A, 110B (FIG. 1). Catch 160 acts to prevent first module 110 from sliding longitudinally in the y-axis, i.e., font-to-back or back-to-front, relative to tray 122. Catch 160 may also act to laterally position modules 110 relative to one another. As observed in FIG. 8, catch 160 has a longitudinal length sufficient to resist movement of latch 120 once latch 120 is seated against catch 160. Catch 160 may also be shaped to accommodate particular modules; however, this may not be necessary in all instances.

Rear retaining member 146 may also include a post retainer 170 protruding from tray 122 for vertically retaining a first mounting rail 118L of a respective module. Post retainer 170 may include a post 172 including a retainer 174 that allows passage of a rear end 178 of mounting rail 118 of module 110 towards tray 122 and retention of mounting rail 118, and hence, second end 148 of module 110 against tray 122. Retainer 174 may include any element capable of allowing selective retention of rear end 178 of mounting rail 118, e.g., a protrusion, spring clip, etc. In the examples shown, retainer 174 includes a protrusion on end of post 172 having a vertical position relative to tray 122 such that it engages an upper surface of rear end 178 of mounting rail 118. Post 172 is positioned longitudinally (y-axis) and laterally (x-axis) so as to laterally position adjacent modules and rear end 178 of mounting rail 118. As shown best in FIGS. 8 and 9, rear retaining member 146 may also include a rail engaging seat 176 protruding from tray 122 for vertically positioning an opposing, second mounting rail 118R of the respective module 110. Each rail engaging seat 176 may include, for example, a substantially horizontal seat for vertically positioning mounting rail 118R relative to tray 122. Here, a mounting rail 118R on a right side of a module 110, as illustrated, extends slightly more rearwardly, i.e., toward connectors 114, than a mounting rail 118L on the left side such that mounting rail 118R sits atop seat 176, thus assisting in vertical positioning of a module 110. Rail engaging seat 176 may take a variety of other forms, if desired, such as but not limited to a seat having an element capable of mating with a corresponding element on mounting rail 118R.

As illustrated, post retainer 170 for a first module is integral with rail engaging seat 176 for a second, adjacent module. However, this configuration is not necessary in all instances as both structure can be positioned separately.

Referring to FIGS. 6 and 7, collectively, in order to accommodate outermost modules 110A, 110C (FIGS. 1 and 5), rear retaining member 146 may further include additional structure. In one embodiment, rear retaining member 146 may further include a catch 160R and a rail engaging seat 176R on a first rail 124R, and a post retainer 170L on a second rail 124L. More particularly, a right side rail 124R of the pair of rails may include catch 160R for longitudinally engaging and retaining latch 120 of an outermost module 110C (FIGS. 1 and 5) of the plurality of modules 110A-C (FIGS. 1 and 5) used. Further, right side rail 124R may include a rail engaging seat 176R for vertically positioning mounting rail 118R of outermost module 110C of the plurality of modules 110A-C. Rear retaining member 146 may also include a post retainer, i.e., post 172L with retainer (not labeled) on a second, opposing rail 124L for vertically engaging and retaining a mounting rail 118L of an opposing, outermost module 110A (FIGS. 1 and 5) of the plurality of modules 110A-C. It is emphasized that while the mounts have been described relative to a particular left-right arrangement, the configuration can be switched, if desired. That is, the configuration can be switched such that catches 160 and rail engaging seats 176 are on a left side of modules 110 and post retainers 170 are on the right side of modules 110.

Although a particular arrangement of rear and front retaining members have been described herein, it is emphasized that a variety of other mechanisms may be possible to releasably retain modules 110 to tray 122, all of which are considered within the scope of the invention.

Returning to FIGS. 1 and 5, holder 100 may further include a cable passage 180 extending through tray 122 adjacent a rear end 148 of at least one of modules 110A-C. In this fashion, fiber optic cable running to connectors 114 can be easily routed to connectors 114. Cable passages 180 may have any shape desired to accommodate the fiber optic cables.

As shown in FIG. 7, holder 100 may also include a drop handle positioning member 182 extending from each rail 124L, 124R for positioning a conventional drop handle 184. As understood, a drop handle 184 may include a shelf 186 for accepting and routing fiber optic cable, e.g., left or right, within a fiber optic cable distribution chassis 104 (FIG. 2). A patch-cord radius control member 188 (leftward version shown) may assist in routing the fiber optic cable. A cover 190 may pivot to enclose cable on shelf 186. As shown in FIG. 2, once cover 190 is pivoted to enclose shelf 186 (FIG. 7), holder 100 may be slid into a slot 102 in chassis 104. In order to assist in alignment of holder 100 into slot 102, as shown in FIGS. 1 and 5, each rail 124L, 124R may include a ramped portion 192 at a rear end of tray 122.

Holder 100 may be formed in a number of ways. In one embodiment, holder 100 may include tray 122 made of metal, e.g., sheet metal, and mounts (140, 146) and rails 124L, 124R may include over-molded plastic. The over-molded plastic may be exclusively plastic, or portions of metal may be positioned within the plastic. In one embodiment, holder 100 may be entirely plastic. Other materials may also be possible.

Figure 11:
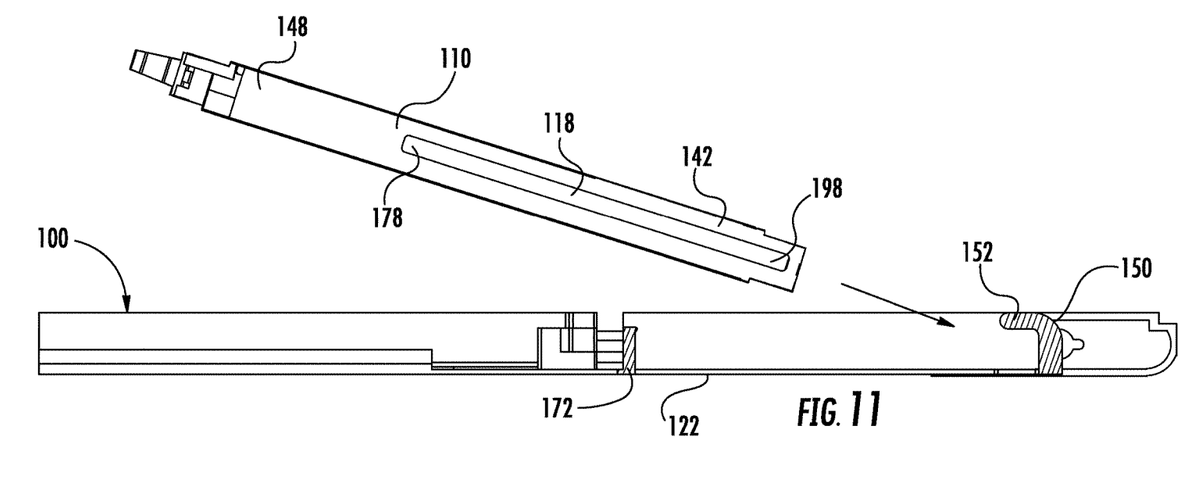
FIGS. 11-13 are cross-sectional views of a method of mounting a module to the module holder according to embodiments of the invention.
Figure 12:
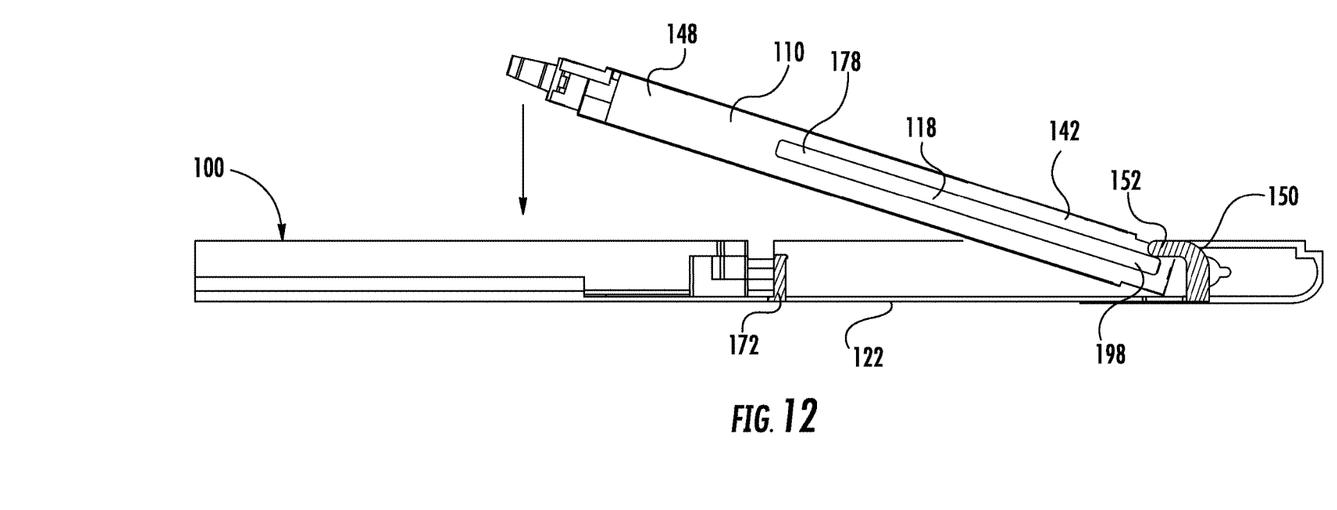
Figure 13:
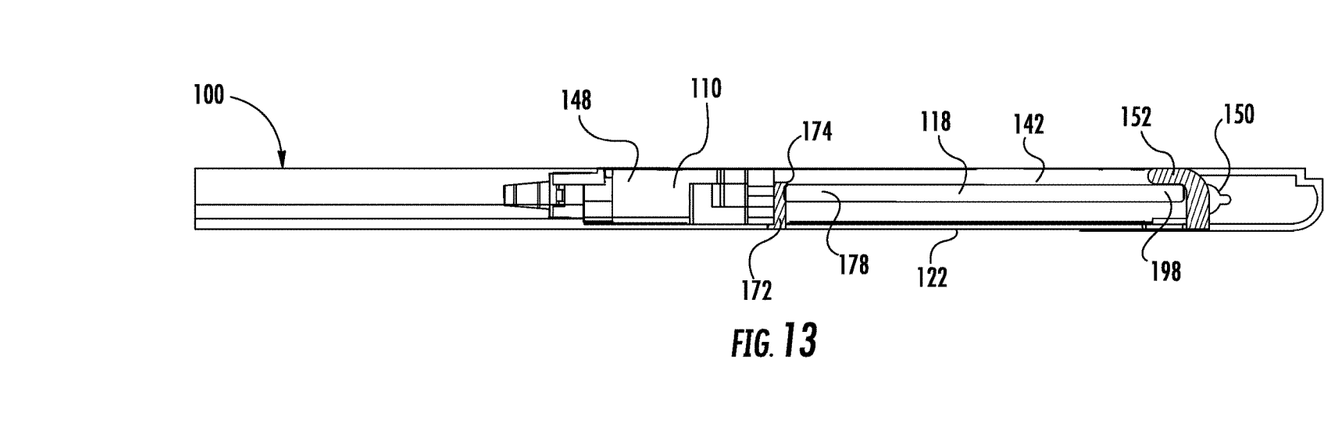

Referring to FIGS. 11-13, along with FIG. 2, various embodiments of a method according to the invention will now be described. FIGS. 11-13 show cross-sectional views of holder 100 such that hook member 150 and post 172 are bisected. FIGS. 11-13 show progressive steps of having a module 110 mounted to holder 100. In one embodiment of the method a fiber optic cable module holder 100 as described herein is provided. As shown in FIGS. 11-13, at least one module 110 is mounted to a respective module mount of holder 100. As illustrated, each module 110 is initially held angled relative to holder 100, as shown in FIG. 11, and then moved such that a front end 198 of mounting rail 118 can enter hook member 150. As shown in FIG. 12, movement of rear end 148 of module 110 acts to have retainer 174 (FIG. 13 only) of post retainer 170 engage and vertically retain mounting rail 118, and hence module to tray 122. The mounting may include mounting a module 110 to each respective module mount of the holder, or a lesser number. Subsequently or prior to mounting of module 110 to holder 100, a plurality of fiber optic cables (FIG. 2) may be coupled using the at least one module 110. Holder 100 may then be positioned in a slot 102 of chassis 104, i.e., using rails 124R, 124L (FIGS. 6 and 7). Subsequently, modules 110 may be replaced or interchanged for different types of modules without changing holder 100.

In an alternative embodiment, a fiber optic cable distribution frame 105 may also be provided that includes a chassis 104 including a plurality of slots 102, each slot configured to hold a fiber optic cable module. In this case, however, each slot 102 may hold a fiber optic cable module holder 100 according to the various embodiment of the invention. As noted above, each module holder 100 may include a tray 122, a plurality of mounts coupled to tray 122. Each mount is configured to operatively position a module 110 relative to tray 122. Holder 100 also may include a rail 124L, 124R protruding from each of a pair of opposing sides 126, 128 of tray 122 for positioning the holder in a chassis 104. Each module holder 100 may include one or more modules 110 in respective module mounts.

Module holder 100 provides a mechanism to diversify the form of modules used in a chassis 104 of a conventional fiber optic cable distribution frames 105. Holder 100 provides increased flexibility to users as any of a variety of modules can be employed, even in various combinations. In addition, the various modules can be used without requiring a change of the conventional frames. By using a common mount, a large variety of different modules 110 can be used without changing holder 100, providing flexibility in the field in terms of initial setup and later modifications.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A holder for a plurality of fiber optic cable modules, the holder comprising:
   a tray, wherein the tray is movably positionable in a chassis; and
   a plurality of mounts coupled to the tray, each mount configured to releasably retain a module of a plurality of various types of fiber optic cable modules relative to the tray, wherein each mount includes:
      a front retaining member for retaining a first end of a respective module to the tray; and
      a rear retaining member for retaining a second end of the respective module to the tray, wherein the rear retaining member includes:
         a catch protruding from the tray for longitudinally engaging a latch of a respective module;
         a post retainer protruding from the tray for vertically retaining a first mounting rail of the respective module; and
         a rail engaging seat protruding from the tray for vertically positioning an opposing, second mounting rail of the respective module.

2. The holder of claim 1, further comprising a cable passage extending through the tray adjacent an end of at least one of the modules.

3. The holder of claim 1, wherein the front retaining member includes a pair of hook members protruding from the tray, each hook member engaging a respective mounting rail on a side of the respective module.

4. The holder of claim 3, wherein each hook member includes a rounded end.

5. The holder of claim 3, wherein at least one hook member engages adjacent mounting rails of a pair of adjacent modules to retain a pair of first ends of adjacent modules to the tray.

6. The holder of claim 1, wherein the post retainer for a first module is integral with a rail engaging seat for a second, adjacent module.

7. The holder of claim 1, further comprising a pair of rails, each rail protruding from one of a pair of opposing sides of the tray for positioning the holder in the chassis.

8. The holder of claim 7, wherein a first rail of the pair of rails includes a catch for longitudinally engaging and retaining a latch of an outermost module of a plurality of modules and a rail engaging seat for vertically positioning a mounting rail of the outermost module of the plurality of modules; and
   a second rail of the pair of rails includes a post retainer for vertically retaining a mounting rail of an opposing, outermost module of the plurality of modules.

9. The holder of claim 1, wherein the rail engaging seat includes a substantially horizontal seat for vertically positioning the mounting rail relative to the tray.

10. The holder of claim 1, further comprising a pair of rails, each rail protruding from one of a pair of opposing sides of the tray for positioning the holder in the chassis.

11. The holder of claim 1, wherein the plurality of mounts includes three mounts.

12. The holder of claim 1, further comprising a drop handle positioning member extending from each rail.

13. The holder of claim 1, wherein each rail includes a ramped portion at a rear end of the tray.

14. The holder of claim 1, wherein the tray includes metal, and the plurality of module mounts and the rail include over-molded plastic.

15. A fiber optic cable frame, comprising:
a chassis including a plurality of slots, each slot configured to hold a fiber optic cable module holder, each module holder including:
a tray, wherein the tray is movably positionable in the chassis; and
a plurality of mounts coupled to the tray, each mount configured to releasably retain a module of a plurality of various types of fiber optic cable modules relative to the tray, wherein each mount includes:
a front retaining member for retaining a first end of a respective module to the tray; and
a rear retaining member for retaining a second end of the respective module to the tray, wherein the rear retaining member includes:
a catch protruding from the tray for longitudinally engaging a latch of a respective module;
a post retainer protruding from the tray for vertically retaining a first mounting rail of the respective module; and
a rail engaging seat protruding from the tray for vertically positioning an opposing, second mounting rail of the respective module.

16. The fiber optic cable frame of claim 15, wherein each holder includes a module in each module mount.

17. The fiber optic cable frame of claim 15, wherein each holder further includes a pair of rails, each rail protruding from one of a pair of opposing sides of the tray for positioning the holder in the chassis.

* * * * *